United States Patent
Leska et al.

(10) Patent No.: US 8,814,233 B2
(45) Date of Patent: Aug. 26, 2014

(54) SAFETY SWITCH FOR GENERATING A SYSTEM ENABLE SIGNAL DEPENDING ON THE POSITION OF A MOVABLE GUARD DOOR

(75) Inventors: Tobias Leska, Coswig (DE); Tilo Schmidt, Coswig (DE); Udo Kramer, Coswig (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/106,888

(22) Filed: May 13, 2011

(65) Prior Publication Data

US 2011/0259060 A1    Oct. 27, 2011

Related U.S. Application Data

(63) Continuation of application No. PCT/EP2009/007946, filed on Nov. 6, 2009.

(30) Foreign Application Priority Data

Nov. 25, 2008    (DE) .......................... 10 2008 060 004

(51) Int. Cl.
*E05B 15/02* (2006.01)
*F16P 3/10* (2006.01)
*E05C 1/06* (2006.01)

(52) U.S. Cl.
CPC . *F16P 3/10* (2013.01); *Y10S 292/65* (2013.01)
USPC ..... 292/341.16; 292/144; 292/254; 292/DIG. 65; 70/277; 70/278.1; 70/278.7; 70/280; 307/326

(58) Field of Classification Search
USPC ............. 292/95, 96, 137, 138, 144, 145, 146, 292/150, 151, 184, 189, 254, 340, 341.15, 292/341.16, DIG. 25, DIG. 30, DIG. 65; 70/277, 174, 278.1, 278.7, 279.1, 280; 307/326, 328; 200/61.62, 61.64, 61.67, 200/61.68, 332–334; 340/5.2, 5.7
See application file for complete search history.

(56) References Cited

U.S. PATENT DOCUMENTS 1,684,980 A * 9/1928 Ward et al. ...................... 70/282
1,768,021 A * 6/1930 Bauerband ...................... 70/282

(Continued)

FOREIGN PATENT DOCUMENTS

DE           102 52 025 A1    5/2004
DE    10 2005 057 108 A1    5/2007

(Continued)

OTHER PUBLICATIONS

Machine-generated translation of DE 10252025 A1, http://gb.espacenet.com/search97cgi/s97_cgi.exe?Action=FormGen&Template=gb/EN/home.hts.*

(Continued)

*Primary Examiner* — Kristina Fulton
*Assistant Examiner* — Alyson M Merlino
(74) *Attorney, Agent, or Firm* — Harness, Dickey & Pierce, P.L.C.

(57) ABSTRACT

A safety switch for generating a system enable signal depending on the position of a movable guard door which is used for safeguarding a hazardous area of a machine installation. At least one part of the machine installation can only be operated when the system enable signal is present. The safety switch has a door part to be fastened to the movable guard door and a frame part to be fastened to a mating door piece. The safety switch also has a bolt which can be moved between a first position and a second position, a recess in which the bolt can engage in the second position, and a locking element designed to block the bolt in the second position. In addition, the safety switch comprises a first position sensor designed to clearly detect at least one of the positions of the bolt in order to generate the system enable signal. Moreover, the safety switch comprises a door release request unit configured to generate a door release request signal in addition to the system enable signal.

15 Claims, 6 Drawing Sheets

(56) References Cited

U.S. PATENT DOCUMENTS

| | | | | |
|---|---|---|---|---|
| 2,786,701 | A * | 3/1957 | Povlich | 292/144 |
| 3,624,761 | A * | 11/1971 | Kohn | 180/289 |
| 3,758,142 | A * | 9/1973 | Gartner | 292/254 |
| 3,829,138 | A * | 8/1974 | Morita | 292/254 |
| 3,919,869 | A * | 11/1975 | Fromm | 70/263 |
| 4,091,866 | A * | 5/1978 | Curatolo | 165/138 |
| 4,454,392 | A * | 6/1984 | Rapp et al. | 200/61.67 |
| 4,529,234 | A * | 7/1985 | Senften | 292/169.15 |
| 4,563,886 | A * | 1/1986 | Kletzmaier et al. | 70/118 |
| 4,691,948 | A * | 9/1987 | Austin et al. | 292/171 |
| 4,784,415 | A * | 11/1988 | Malaval | 292/144 |
| 4,840,050 | A * | 6/1989 | Gotanda | 70/107 |
| 4,904,005 | A * | 2/1990 | Frolov | 292/251.5 |
| 5,029,912 | A | 7/1991 | Gotanda | |
| 5,062,670 | A * | 11/1991 | Grossman | 292/137 |
| 5,490,698 | A * | 2/1996 | Dezso | 292/138 |
| 5,603,184 | A * | 2/1997 | Campbell et al. | 49/394 |
| 5,746,458 | A * | 5/1998 | Fisher | 292/252 |
| 5,760,353 | A * | 6/1998 | Rapp | 200/17 R |
| 5,943,888 | A * | 8/1999 | Lawson | 70/278.7 |
| 5,987,818 | A * | 11/1999 | Dabideen | 49/280 |
| 6,032,500 | A * | 3/2000 | Collard et al. | 70/278.1 |
| 6,035,676 | A * | 3/2000 | Hudspeth | 70/278.1 |
| 6,092,846 | A * | 7/2000 | Fuss et al. | 292/302 |
| 6,283,514 | B1 * | 9/2001 | Letzel | 292/142 |
| 6,318,138 | B1 * | 11/2001 | Mathews et al. | 70/278.7 |
| 6,539,760 | B1 * | 4/2003 | Letzel et al. | 70/276 |
| 6,580,355 | B1 * | 6/2003 | Milo | 340/5.7 |
| 6,801,112 | B1 * | 10/2004 | Saxer | 335/205 |
| 7,010,948 | B1 * | 3/2006 | Hsieh | 70/257 |
| 7,357,429 | B2 * | 4/2008 | Eichenauer | 292/144 |
| 7,439,639 | B2 * | 10/2008 | Nitsche | 307/326 |
| 7,504,747 | B2 * | 3/2009 | Pullmann et al. | 307/117 |
| 7,775,072 | B2 | 8/2010 | Pullmann et al. | |
| 7,888,825 | B2 * | 2/2011 | Iida et al. | 307/326 |
| 7,898,118 | B2 * | 3/2011 | Nitsche et al. | 307/326 |
| 7,948,121 | B2 * | 5/2011 | Nitsche et al. | 307/326 |
| 7,948,391 | B2 * | 5/2011 | Pullmann et al. | 340/679 |
| 7,956,300 | B2 * | 6/2011 | Hidaka et al. | 200/43.04 |
| 2003/0178857 | A1 * | 9/2003 | Caspi et al. | 292/144 |
| 2004/0159134 | A1 * | 8/2004 | Eichenauer | 70/278.1 |
| 2007/0204662 | A1 | 9/2007 | Pullmann et al. | |
| 2007/0205089 | A1 * | 9/2007 | Fukumoto et al. | 200/334 |
| 2009/0072631 | A1 | 3/2009 | Iida et al. | |
| 2010/0038217 | A1 | 2/2010 | Bretschneider et al. | |
| 2011/0133574 | A1 * | 6/2011 | Nitsche et al. | 307/326 |

FOREIGN PATENT DOCUMENTS

| | | |
|---|---|---|
| DE | 10 2006 020 500 A1 | 10/2007 |
| DE | 10 2007 013 480 A1 | 9/2008 |
| EP | 1 288 401 A1 | 3/2003 |
| EP | 1 677 167 A2 | 7/2006 |
| EP | 1 795 676 A2 | 6/2007 |
| EP | 1 911 553 A1 | 4/2008 |

OTHER PUBLICATIONS

J. Groschinski et al., Sicherheitssysteme fuer Bearbeitungszentren, XP-001089004, 2002, 3 pages.

* cited by examiner

SAFETY SWITCH FOR GENERATING A SYSTEM ENABLE SIGNAL DEPENDING ON THE POSITION OF A MOVABLE GUARD DOOR

CROSS REFERENCES TO RELATED APPLICATIONS

This application is a continuation of international patent application PCT/EP2009/007946 filed on Nov. 6, 2009 designating the U.S., which international patent application has been published in German language and claims priority from German patent application DE 10 2008 060 004.0 filed on Nov. 25, 2008. The entire contents of these prior applications are incorporated herein by reference.

BACKGROUND OF THE INVENTION

The present invention relates to a machine installation comprising a safety switch for generating a system enable signal, and, more particularly, to a safety switch for generating a system enable signal in response to the position of a movable guard door for safeguarding a hazardous area of a machine.

Safety switches of this kind may also be referred to as guard locking devices having a failsafe guard lock. They are desired on guard doors, guard flaps or the like, i.e. on moveable members intended to temporarily prevent access to an automated machine or tool as long as the machine or tool is in a hazardous operating state. The machine may be, for example, a robot, a machine tool having a rotating spindle, a transportation or conveying system, a press or any other machine whose operation presents a hazard to people located in the working area of the machine. The safety switches are used as signaling devices for signaling the closed position of the guard door to a control unit, so that the control unit is allowed to control automated operation of the machine. Typically, the control unit is designed to allow start-up of the machine only when the guard door is closed. If the guard door is opened during machine operation, the control unit must bring the machine into a non-hazardous state by switching off, for example, the power supply to the machine.

There are some machines which still represent a hazard for a certain amount of time even after they have been shut down, for example because a drive of the machine needs time to come to a final standstill. For such situations, safety switches are desired which prevent the guard door from being opened until the machine has reached its non-hazardous state. This function is sometimes referred to as a guard lock.

Typical safety switches involving a guard lock have a bolt (sometimes called an actuator) which is typically arranged on the movable guard door part. When the guard door is closed, the bolt may engage in a receptacle on the door frame, which is detected with the aid of one or more sensors. In the case of a safety switch with a guard lock, the bolt is also locked in the bolt receptacle, preventing it from being withdrawn. In some cases, the bolt may perform two functions, namely that of a detector element, with the aid of which the closed position of the guard door can be detected, and secondly that of a "true" bolt which prevents the guard door from being opened as long as the bolt is locked in the bolt receptacle. The bolt may be released via an electromotive actuator which is activated by the control unit when the monitored machine or system has reached its safe state.

DE 10 2005 057 108 A1 discloses a safety switch having the functions of a guard lock and a closed door monitor. This safety switch does not have any option for releasing the guard door. In practice, a release signal required to unlock the guard door is generated in a remote safety switching device using a switch located in the region of the safety switching device. The spatial distance is disadvantageous if the safeguarded machine or system is intended to be operated in special operating modes, such as during set-up or fault correction. The spatial distance also makes it difficult to quickly intervene in the machine, for example in the event of a malfunction.

SUMMARY OF THE INVENTION

Against this background, it is an object to provide an improved safety switch allowing simpler and faster handling in terms of releasing a guard door.

According to an aspect of the invention, there is provided a machine installation comprising a machine capable of being operated in an automated manner, said machine defining a hazardous area during operation in said automated manner, comprising a guard door for safeguarding the machine, said guard door having an open position providing access to the hazardous area and a closed position preventing access to the hazardous area, said guard door abutting on a stationary door frame in the closed position, comprising a safety switch for generating a system enable signal when the guard door is in the closed position, and comprising a machine controller for controlling operation of the machine as a function of the system enable signal, said safety switch comprising a door part designed to be fastened to the guard door and a frame part designed to be fastened to the door frame, a bolt moveable between a first position and a second position, a recess in which the bolt engages in the second position, a locking element designed to block the bolt in the second position for locking the guard door in the closed position, an actuator for moving the locking element between a third and a fourth position, said locking element blocking said bolt when in the third position, a first position sensor designed to clearly detect at least one of the positions of the bolt in order to generate the system enable signal in dependence thereon, and a door release unit configured to generate a door release request signal in addition to the system enable signal, said door release request signal signaling to the machine controller a request to provide a drive signal that moves the actuator from the third position to the fourth position.

According to another aspect, there is provided a safety switch for generating a system enable signal for a machine controller, said safety switch comprising a door part designed to be fastened to the movable guard door and a frame part designed to be fastened to the door frame, a bolt moveable between a first position and a second position, a recess in which the bolt engages in the second position, a locking element designed to block the bolt in the second position for locking the guard door in the closed position, an actuator for moving the locking element between a third and a fourth position, said locking element blocking said bolt when in the third position, a first position sensor designed to clearly detect at least one of the positions of the bolt in order to generate the system enable signal in dependence thereon, and a door release unit configured to generate a door release request signal in addition to the system enable signal, said door release request signal signaling to the machine controller a request to provide a drive signal that moves the actuator from the third position to the fourth position.

The new safety switch and the new machine installation for the first time make it possible to request a door release request signal directly on the safety switch. The spatial distance between the location at which the door release previously had to be requested and the location at which the guard door is situated is dispensed with. The door release unit preferably operates electrically. The door release unit determines a release signal depending on variables which are supplied to it. Therefore, the door release unit is different from mechanically operated emergency unlocking devices.

In a refinement, the door part has the bolt and the frame part has the recess.

This refinement has the advantage that sensors can be used to detect the closed and locked guard door, since all movable components may be combined on the movable guard door in this arrangement, and a power supply can therefore be effected without any problems via the mating door piece.

In a further refinement, the first position sensor is designed to detect the second position of the bolt in a failsafe manner.

In this case, "failsafe" means that the sensor can detect the second position of the bolt only when the bolt is truly in said second position. It is particularly preferred if the sensor is arranged on the frame part, and in particular in the region of the recess. This is because a single sensor suffices in this case to reliably detect the locked position of the guard door, which can result in the monitored machine or system being enabled. The arrangement of the sensor in the region of the recess is particularly preferred because it enables a compact implementation with a high degree of fail-safety.

In another refinement, the first position sensor is designed to read a first transponder, and the bolt comprises a first transponder which is arranged in such a manner that it can be read by the position sensor in one of the two positions only. The transponder is preferably arranged in such a manner that it can be read only in the second position of the bolt. This can be achieved, for example, by virtue of the fact that the transponder is arranged in a depression at that end of the bolt which engages in the recess. This achieves a short switching distance which ensures that the first position sensor responds only when the bolt with the transponder has been introduced into the recess. These preferred refinements enable a particularly simple and cost-effective implementation which also provides a high degree of fail-safety.

In another refinement, the transponder is arranged on a free end face of the bolt, which face is approximately transverse with respect to the direction of movement of the bolt. The transponder is preferably fitted such that it is recessed on the end face. The first position sensor preferably sits on the base of the recess, that is to say opposite the free end of the protruding bolt.

The release unit may be connected to a machine controller which can generate a drive signal for an actuator depending on variables supplied to it, wherein the actuator is designed to influence the position of the locking element relative to the bolt, wherein the release unit supplies a release request signal to the evaluation unit in the unlocked state, wherein, when the release request signal is present, the evaluation unit can generate a drive signal which is used to drive the actuator in such a manner that the blocking of the bolt in the second position is not allowed or is canceled, wherein the drive signal is generated when a state variable, which is supplied to the evaluation unit and represents the operating mode of at least the part of the system, indicates that the part of the system is in an operating mode which does not correspond to automatic operation in which an application program is usually executed.

This measure has several advantages: use of an actuator which is driven in such a manner that blocking of the bolt in the second position is not allowed or is canceled means that the safety switch operates according to the principle "actuated without power" and thus provides a maximum degree of safety, since the guard door remains locked even when the supplied power is interrupted. By taking into account the operating mode of the system in the process of generating the drive signal ensures that the guard door is unlocked only when the system has assumed a safe state.

In a further refinement, the door release unit comprises a release request sensor configured to detect a door release request, wherein the door release unit, starting from the locked state, assumes the unlocked state when the door release request is detected.

In particular, the release request sensor may be designed to detect a second transponder, wherein the transponder is arranged in a mobile door release request unit, wherein the door release request is detected when the transponder is in the vicinity of the release request sensor.

This refinement allows very flexible handling of the door release. There is a high degree of flexibility with respect to the fitting of the door release unit to the guard door on account of the fact that the door release request can be detected wireless. In addition, transponders can be programmed, which allows great degrees of freedom when allocating rights to request a door enable.

In another refinement, the second transponder comprises identification data which are detected by the release request sensor as a door release request. The release unit may comprise a signal processing unit in which a release request signal supplied to an evaluation unit is generated depending on the identification data. The evaluation unit can generate a drive signal for an actuator depending on input variables including the release request signal. The actuator is designed to influence the position of the locking element relative to the bolt, wherein, when the release request signal is present, the evaluation unit generates the drive signal. The transponder data may represent an operating mode which does not correspond to automatic operation in which an application program is usually executed.

Each transponder may have unique identification data which can be used to uniquely identify the transponder. This allows to assign different rights to the respective transponder and, accordingly, to a person having possession of this transponder, as far as the request for a door enable is concerned.

The release unit may comprise a plurality of input elements configured to detect manual inputs. The detected inputs may be supplied to a signal processing unit, wherein the release request signal is determined in the signal processing unit depending on the detected inputs. The input elements may be designed to be able to be changed to an active state by the signal processing unit, wherein the input elements can detect inputs only in the active state. Each one of these input elements may be assigned with one of a plurality of different special operating modes, in which the machine can be operated. Each of these special operating modes may differ from an automatic operating mode in which the machine is usually operated according to an application program. The signal processing unit may decide which input elements are changed to the active state depending on the identification data.

This refinement adds a simple implementation of an operating mode selector switch. The safety switch thus has a plurality of input elements which preferably are in the form of pushbuttons. A special operating mode is allocated to each of these pushbuttons. If a door release is now requested using a transponder, those special operating modes which are assigned to this respective transponder and to its owner may be enabled for selection according to the identification data contained in the transponder. The input elements and/or the signal processing unit are preferably designed in such a manner that only one input is accepted at a time. In other words, two special operating modes could not be selected at the same time. Preferably, a check may first be carried out in order to determine whether the owner of the transponder is actually entitled to request a door release.

In another refinement, the second transponder may comprise special operating mode data which represent one of a plurality of different special operating modes, in which the part of the system can be operated, wherein each of these special operating modes differs from an automatic operating mode. This refinement has the advantage that the special operating modes may be directly stored in the transponder. Input via the input elements may be dispensed with.

In another refinement, the locking element can be moved between a third position and a fourth position, and the frame part has a spring which biases the locking element in the third position, wherein the third position is designed to lock the bolt in the second position, wherein the frame part also has an actuator designed to move the locking element into the fourth position against the spring or to hold it in the fourth position if the door release unit is in the unlocked state.

This refinement biases the locking element—preferably without electrical energy from the outside—in the "safe" position. The locking element thus automatically locks the bolt as soon as blocking is actually possible. This refinement is a particularly simple and reliable implementation.

Arranging the actuator in the frame part also contributes to the door part managing without electrical supply lines and accordingly being simple to assemble. Use of a solenoid or a similar translatory actuator has proved to be a particularly efficient solution for releasing the locking element, since release is effected across the gap between the frame part and the door part.

In another refinement, the safety switch comprises a second position sensor which is designed to detect the third position of the locking element in a failsafe manner.

In this case, the second position sensor may only detect the third position of the locking element when the latter is actually in the third position. The second position sensor is preferably in the form of a Reed contact, wherein the magnet is accommodated in the locking element and the relay is accommodated in the frame part.

In another refinement, the transponder may comprise identification data which are detected by the release request sensor, wherein the detected identification data are stored in a memory unit, wherein the release unit assumes the unlocked state as long as identification data are stored in the memory unit. If the identification data are detected again, they are advantageously erased from the memory unit.

This refinement makes it possible to realize a door according to the LOTO (Log Out Tag Out) principle. A guard door which has been released can only be locked again and the system can thus be started again only if all persons who have requested release of the guard door have left the system and acknowledged this by holding their transponder in front of the release request sensor.

In another refinement, the safety switch additionally has a display unit which is used to display whether and/or how many persons are in the hazardous area, using the stored identification data. Those persons who have requested a door release can thus easily find out if someone else is in the system. This measure thus contributes to operational safety.

In another refinement, the door release unit and the safety switch form a structural unit, wherein the door release unit is accommodated in the frame part. This refinement is a advantageous implementation of the novel approach. The door release unit is integrated in the safety switch. Only one independent structural unit, rather than two, therefore needs to be installed to the guard door.

It goes without saying that the features mentioned above and the features yet to be explained below can be used not only in the respectively stated combination but also in other combinations or alone without departing from the scope of the present invention.

BRIEF DESCRIPTION OF THE DRAWINGS

Exemplary embodiments of the invention are illustrated in the drawing and are explained in more detail in the following description. In the drawing.

DESCRIPTION OF PREFERRED EMBODIMENTS

Figure 1:
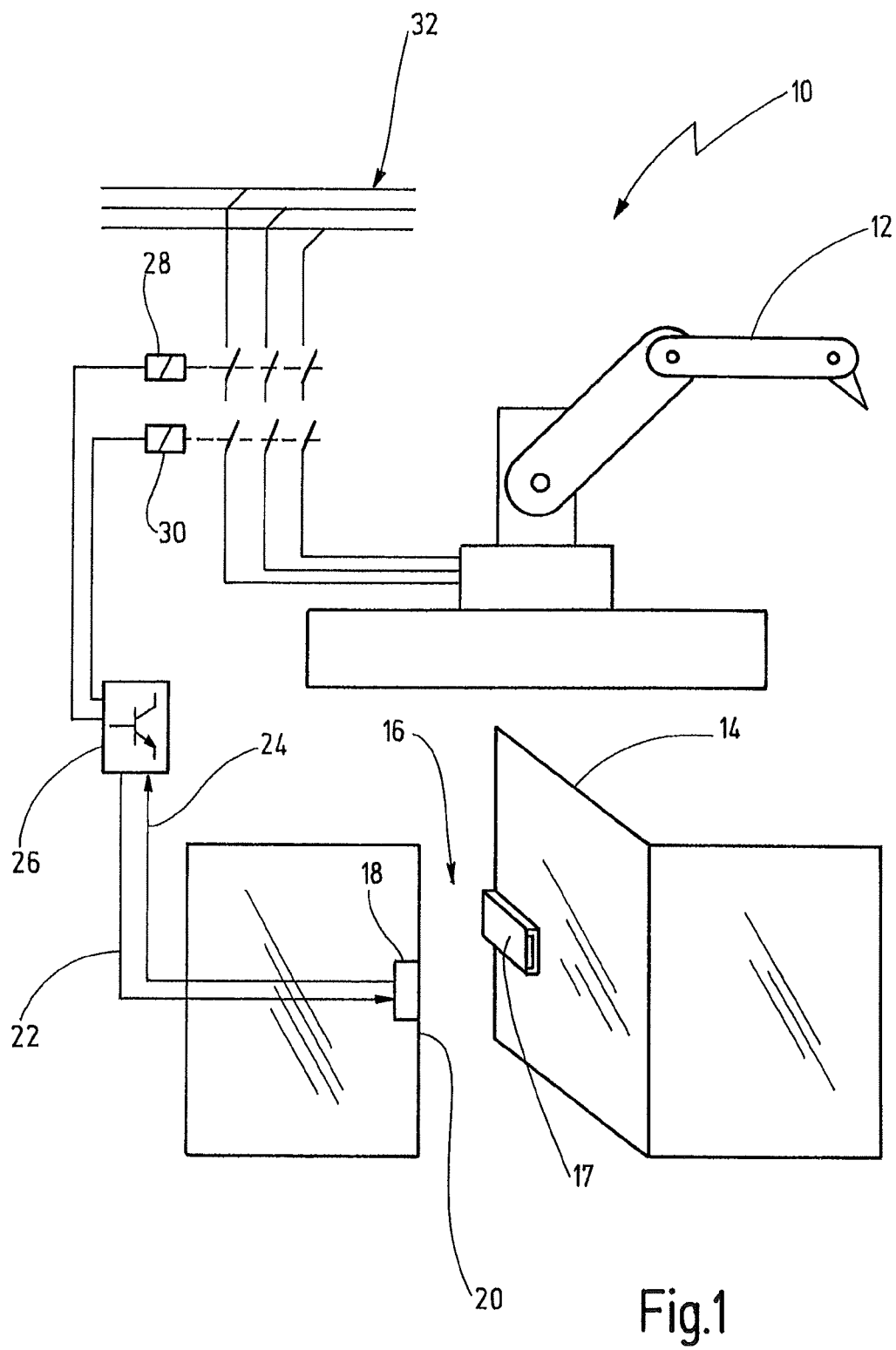
FIG. 1 shows a simplified illustration of an installation employing the novel safety switch.

In FIG. 1, an installation comprising the novel safety switch is designated, in its entirety, by reference numeral 10. In this case, the installation 10 comprises a robot 12 whose working area is safeguarded with the aid of a guard door 14. If a small system is involved, the robot may correspond to this system. For a more complex system, the robot may be a part of this system.

A safety switch 16 is arranged on the guard door 14. The safety switch 16 comprises a door part 17 mounted to the movable guard door 14, and a frame part 18 mounted to a mating door piece 20. In the exemplary embodiment illustrated, the mating door piece 20 is a stationary stop for the guard door 14. In other exemplary embodiments, the mating door piece 20 may be a second door leaf of a two-part guard door. The fact that it is a vertically hinged door in the exemplary embodiment is not intended to have any restrictive effect. The novel safety switch can also be used in a horizontally hinged door, a flap or a sliding door.

The frame part 18 is connected to a safety switching device 26 via two lines 22, 24. The safety switching device 26 is, for example, a safety switching device of the PNOZ® type which is sold by the assignee of the present invention. These are multi-channel-redundant safety switching devices which are designed to evaluate the output signals from signaling devices, such as the safety switch 16, and to shut down an electrical load in dependence thereon. The electrical load is the robot 12 in this case. Accordingly, the safety switching device 26 drives two contactors 28, 30 whose make contacts are arranged in the connection between a power supply 32 and the robot 12. As an alternative to the safety switching device 26, the safety switch 16 could also be connected to a programmable safety controller, as is sold by the assignee of the present invention under the brand name PSS®.

Figure 2:
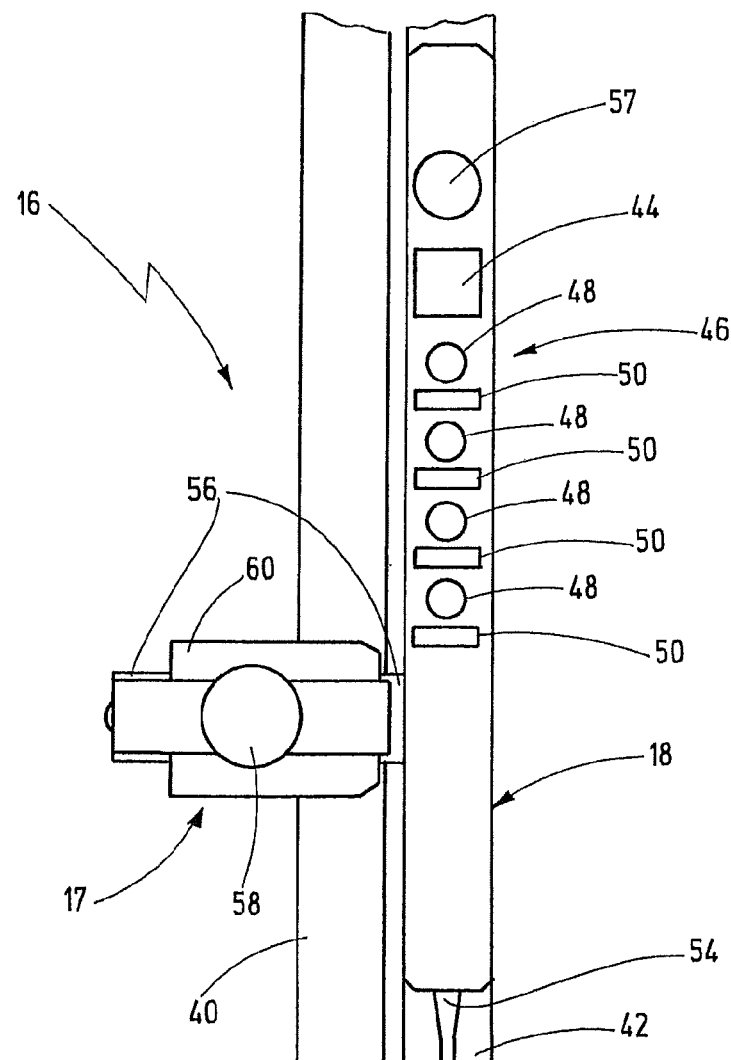
FIG. 2 shows a view of an exemplary embodiment of the novel safety switch from the front.

FIG. 2 illustrates an exemplary embodiment of the safety switch 16 having the door part 17 and the frame part 18. In this case, the door part 17 is arranged on a first frame element 40 of the guard door 14. The frame part 18 is arranged on a second frame element 42 of the guard door 14. The frame part 18 has a release request sensor 44 and a plurality 46 of input elements 48. A respectively assigned inscription field 50 is arranged below each input element 48. Each input element 48 is assigned a special operating mode in which the robot 12 can be operated. The special operating mode involved is noted in the respective inscription field 50. The frame part 18 also has an emergency stop button 52. The frame part 18 is supplied with power via a connecting line 54. The reference numeral 54 is used to denote a connecting cable containing the two lines 22, 24.

The door part 17 comprises a bolt 56 which can be inserted into a recess in the frame part 18, which recess is not illustrated in FIG. 2. For this purpose, the bolt 56 can be moved using a sliding button 58. The bolt 56 is mounted in a guide 60.

Figure 3:
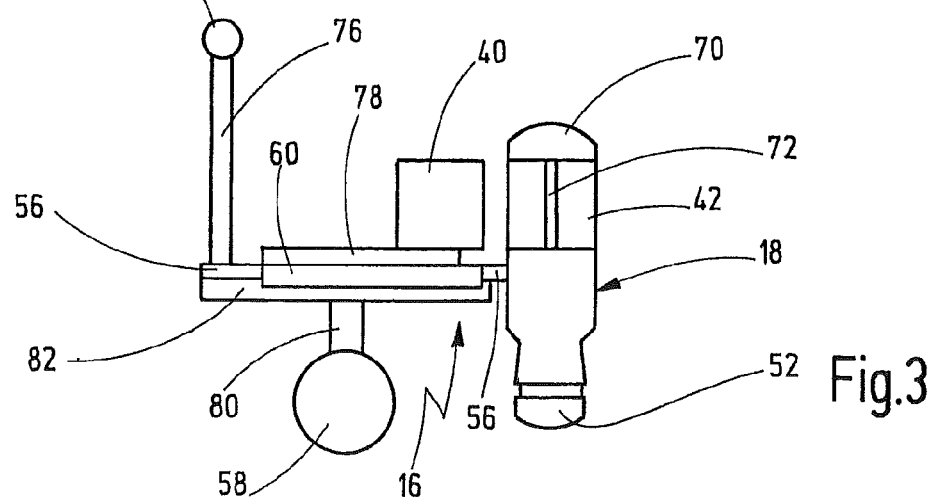
FIG. 3 shows a view of the safety switch from FIG. 2 from above.

FIG. 3 illustrates the safety switch 16 in a view from above. A first unlocking element 70, which is operatively connected to the frame part 18 via an unlocking rod 72, is fitted to the second frame element 42 in the region of the frame part 18 on the side facing the robot 12. A person who has been inadvertently trapped in the system can use the unlocking element 70 to mechanically unlock the guard door 14. Activating the unlocking element 70 destroys or mechanically arrests, for example, an element which locks the guard door and is contained in the frame part 18. If the guard door 14 has been unlocked in this manner, it can be opened by grasping the opening handle 74 which is connected to the bolt 56 via an opening rod 76.

The guide 60 is fastened to the first frame element 40 using a first holding plate 78. The sliding button 58 is fastened, via a sliding rod 80, to a second holding plate 82 to which the bolt 56 is in turn fastened.

Figure 4:
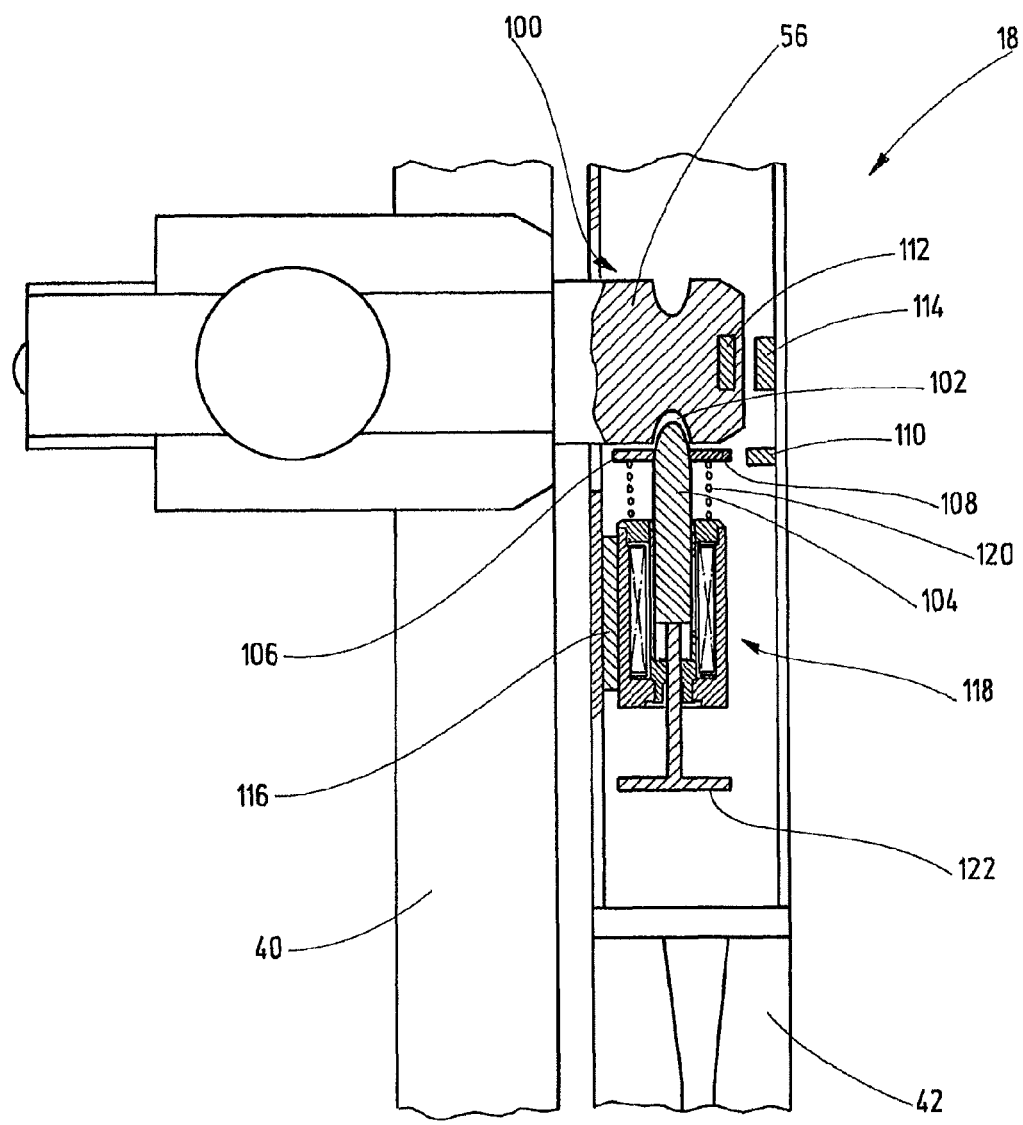
FIG. 4 shows the safety switch from FIG. 2 in a partially sectioned illustration and in the locked state.

FIG. 4 illustrates the door part 17 and the frame part 18 in a partially sectioned manner. The bolt 56 engages in a recess 100 in the frame part 18. The bolt 56 has a shaped portion 102 in which a locking element 104 can engage. At its end facing the bolt, the locking element 104 has a disk-shaped element 106 in which a magnet 108 is embedded. This magnet 108 forms, together with a relay 110, a second position sensor which is in the form of a Reed contact and can be used to detect a third position of the locking element 104. The bolt has a transponder 112 which can be detected by a first position sensor 114. An actuator which is denoted, in its entirety, with the reference numeral 118 is fitted in the frame part 18 using a fitting plate 116. In this case, the actuator 118 is in the form of a solenoid. Arranged between that housing part of the actuator 118 which is assigned to the bolt 56 and the disk-shaped element 106 of the locking element 104 is a spring 120 which biases the locking element 104 in a position of rest in such a manner that it engages in the shaped portion 102 of the bolt 56. This position of rest corresponds to a third position. At its end facing away from the bolt 56, the locking element 104 has an unlocking element 122. The guard door 14 can be unlocked in an emergency with the aid of this unlocking element 122. For this purpose, a cover which is present in the frame part 18 but is not illustrated in FIG. 2 needs to be removed. The unlocking element 122 can be grasped through the resultant opening and the locking element 104 can be moved away from the bolt 56, counter to the force of the spring 120, to such an extent that the guard door 14 is unlocked and can be opened.

In the illustration in FIG. 4, the bolt 56 is in a second position in which it engages in the recess 100. Signal lines were not illustrated in FIG. 4 for reasons of clarity.

Figure 5:
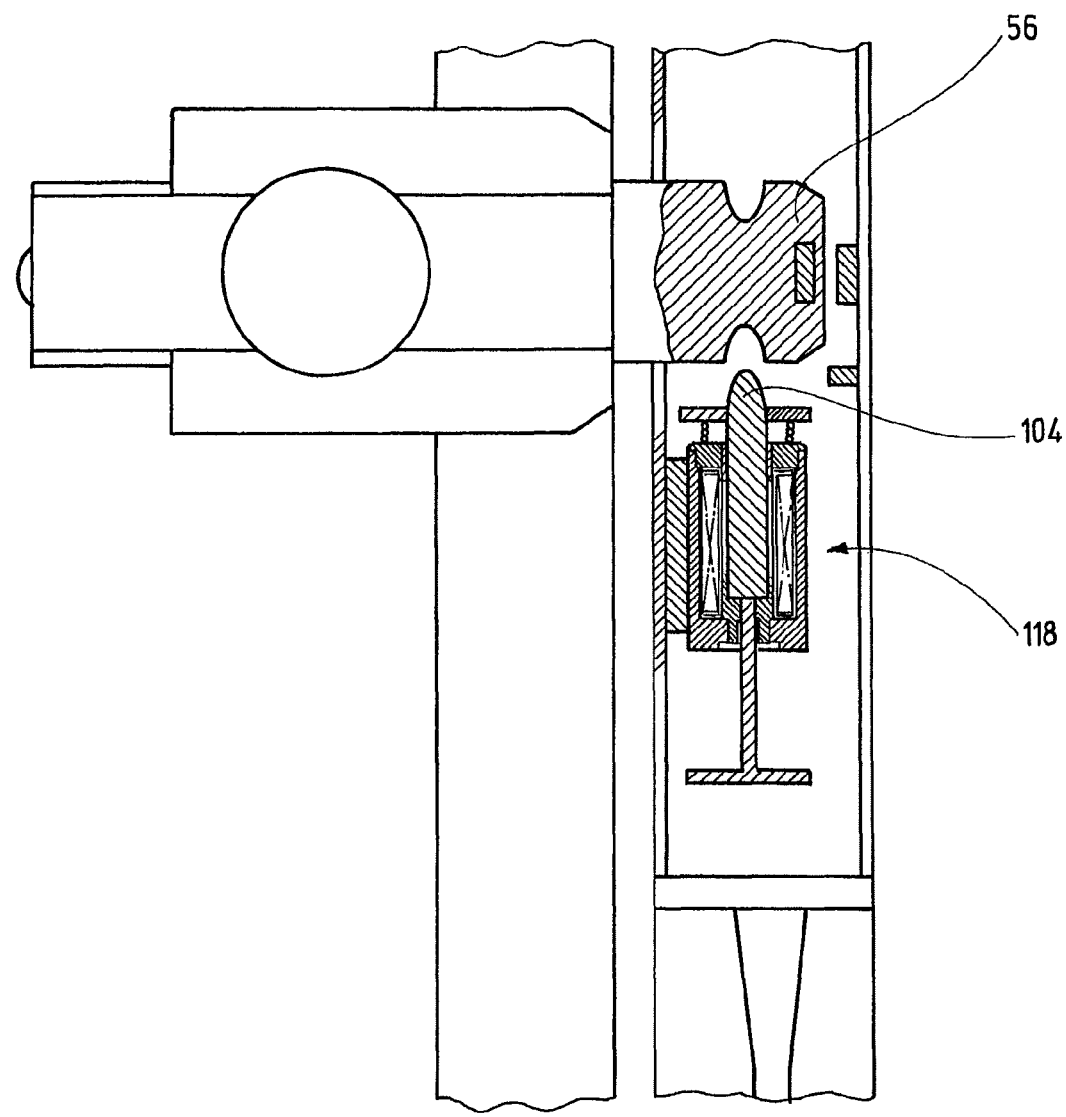
FIG. 5 shows the safety switch from FIG. 4 in the unlocked, closed state.

In the illustration in FIG. 5, the bolt is likewise in the second position. On account of appropriate driving of the actuator 118, the locking element 104 assumes a fourth position in which the locking element no longer engages in the shaped portion 102. The bolt 56 is therefore no longer locked and can be moved out of the recess 100 by hand.

Figure 6:
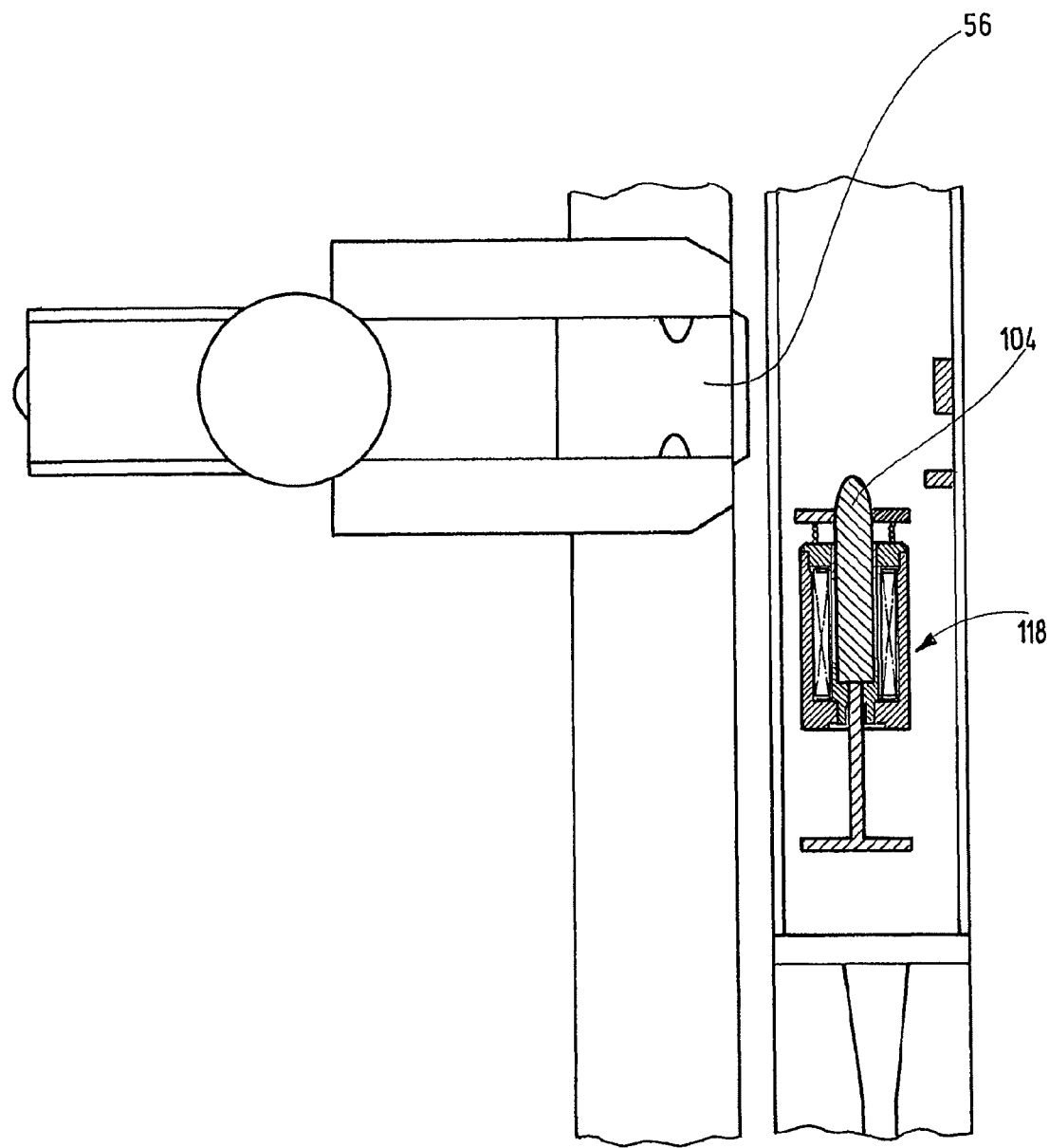
FIG. 6 shows the safety switch from FIG. 4 in the opened state.

In FIG. 6, the actuator 118 is still activated and the locking element 104 is in the fourth position. The bolt 56 has been moved out of the recess 100 by hand and is thus in a first position.

Figure 7:
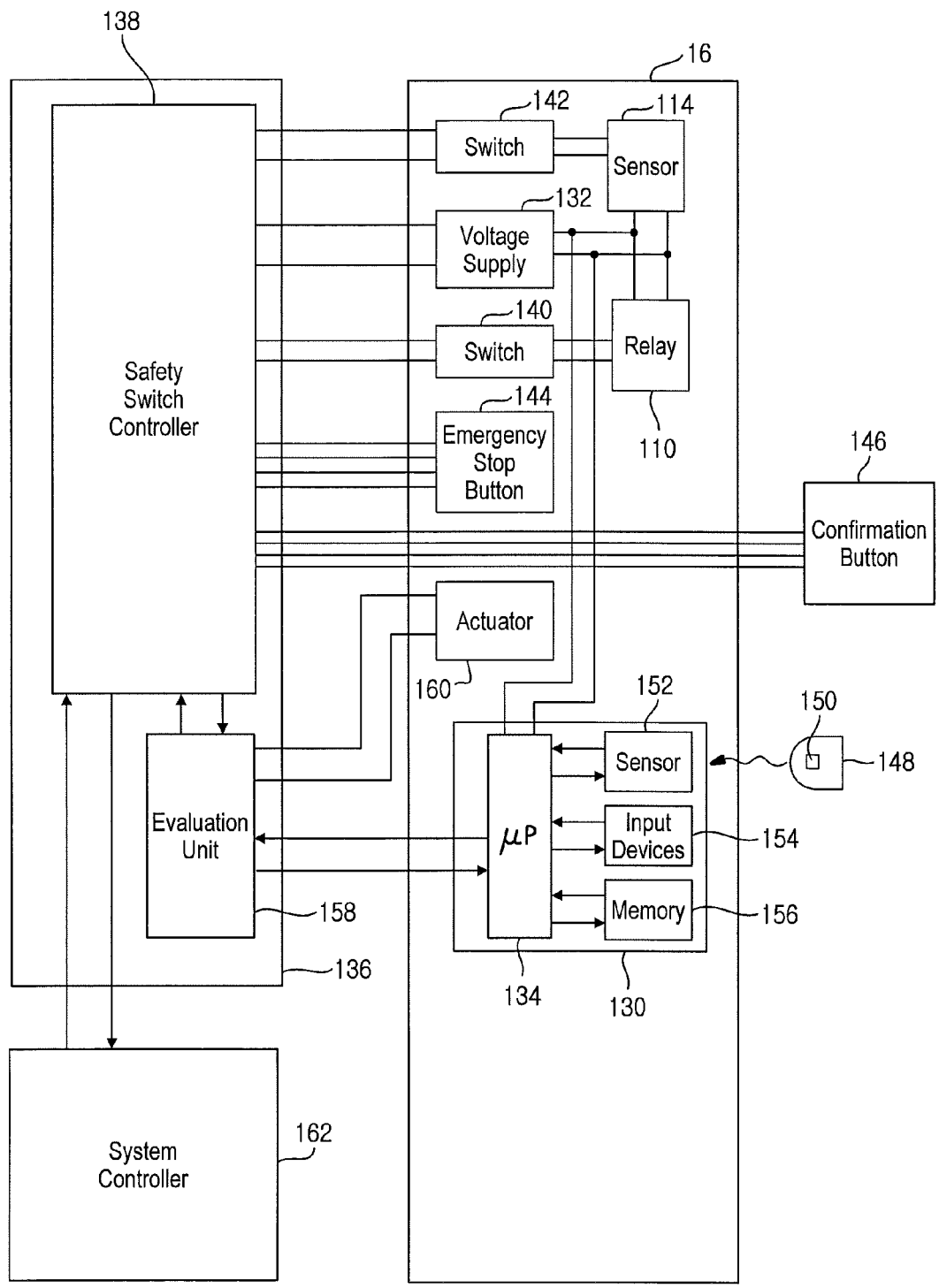
FIG. 7 shows the control functionality of the novel safety switch in the form of a diagrammatic block diagram.

FIG. 7 illustrates the novel safety switch 16 using function blocks. Reference numeral 130 denotes the door release unit of the novel safety switch. The safety switch 16 also has a voltage supply 132 which is used to supply, inter alia, the first position sensor 114 and the relay 110. A signal processing unit 134, for instance a microprocessor, in the door release unit 130 is also supplied with voltage from the voltage supply 132. Reference numeral 136 is used to denote a function block which represents the safety switching device 26 from FIG. 1 or another, remote safety controller. The safety switching device 136 is used to drive the safety switch 16. This is essentially effected using a control block 138. This control block 138 is used to evaluate the relay 110, for example, by driving a first switching element 140 and is used to evaluate the first position sensor 114 by driving a second switching element 142.

Reference numeral 144 designates a block which represents the emergency stop button 52. Reference numeral 146 designates a confirmation button which can be optionally connected to the safety switch 16. Reference numeral 148 designates a door release request unit having a transponder 150. A release request sensor 152 can be used to detect a door release request from the transponder 150. The data acquired in this case are supplied to the signal processing unit 134. If the data acquired are identification data, the latter are evaluated in the signal processing unit 134 in order to determine which of the input elements combined to form the block 154 are changed to an active state. The person using the door release request unit 148 can then use the input elements which are in an active state to select a special operating mode in which the robot 12 is intended to be operated. The signal processing unit 134 also supplies the identification data to a memory unit 156 in which these data are stored in a nonvolatile manner.

If a special operating mode has been selected by pressing one of the input elements, the signal processing unit 134 supplies this to evaluation unit 158. The evaluation unit 158 generates drive signals depending on the variables supplied to it, which signals can be used to drive the actuator 118 represented by block 160. A variable which is evaluated in the evaluation unit 158 in this case is a state variable which is supplied to the safety controller 136 by a system safety controller 162. The state variable represents the operating mode for the robot 12. The evaluation unit 158 can only drive the actuator 118 when the robot is not in an automatic mode.

Variables are supplied to the evaluation unit 158 from the relay 114, the first position sensor 110 and the signal processing unit 134, which variables can be used by the evaluation unit to determine whether or not the guard door 14 is locked, which special operating mode has been selected and which identification data have been stored in the memory unit 156.

What is claimed is:
1. A machine installation comprising:
  a machine capable of being operated in an automated manner, said machine defining a hazardous area during operation in said automated manner,
  a guard door for safeguarding the machine, said guard door having an open position providing access to the hazardous area and a closed position preventing access to the hazardous area, said guard door abutting on a mating door piece in the closed position,
a safety switch for generating a system enable signal when the guard door is in the closed position, and
a safety switching controller for controlling operation of the machine as a function of the system enable signal;
said safety switch comprising:
a door part fastened to the guard door and comprising a bolt movable between a first position and a second position, and
a frame part fastened to the mating door piece and connected to the safety switching controller via multi-channel redundant signal lines, the frame part comprising a recess formed in said frame part and in which the bolt engages in the second position, a locking element movable between a third and a fourth position and designed to latch the bolt in the second position for locking the guard door in the closed position, an actuator for moving the locking element from the third to the fourth position, said locking element latching said bolt when in the third position, a first position sensor designed to detect when said bolt is in at least one of the first and second positions and to transmit via said multi-channel redundant signal lines a first sensor signal to the safety switching controller in dependence thereon to indicate when the guard door is in the closed position and said bolt is in said at least one of the first and second positions, and a door release unit integral to the frame part and configured to transmit via said multi-channel redundant signal lines a door release request signal in addition to the system enable signal, said door release request signal signaling to the safety switching controller a request to provide a drive signal that operates the actuator to move the locking element from the third position to the fourth position.

2. The machine installation of claim 1, wherein the first position sensor is designed to detect the second position of the bolt.

3. The machine installation of claim 1, wherein the bolt comprises a first transponder, and wherein the first position sensor is designed to read the first transponder only when the bolt is in the second position.

4. The machine installation of claim 1, wherein the first position sensor is arranged in the region of the recess.

5. The machine installation of claim 1, further comprising a transponder, wherein the door release unit comprises a release request sensor configured to detect the transponder, and wherein the door release unit generates the door release request signal in response to the detection of a valid transponder.

6. The machine installation of claim 5, wherein the transponder is arranged in a mobile device which is separate from the door part and the frame part.

7. The machine installation of claim 5, wherein the transponder comprises unique identification data and the door release unit generates the door release request signal in accordance with the detection of said unique identification data.

8. The machine installation of claim 7, wherein the frame part of the safety switch further comprises a memory unit for temporarily storing the unique identification data upon a first detection of said unique identification data from the transponder, with said safety switch generating the system enable signal only after a second detection of the unique identification data from the transponder.

9. The machine installation of claim 1, wherein the frame part of the safety switch comprises a second position sensor designed to detect the third position of the locking element.

10. For a machine installation comprising a machine that presents a hazard to people in the vicinity of the machine during automated machine operation, the machine installation further comprising a safety switching controller for controlling operation of the machine and a guard door for safeguarding the machine, said guard door having an open position providing access to a hazardous area in the vicinity of the machine and a closed position preventing access to the hazardous area by abutting a mating door piece, wherein the safety switching controller allows automated operation of the machine only when a system enable signal representing the closed position is present, a safety switch for generating the system enable signal comprising:
a door part designed to be fastened to the movable guard door and comprising a bolt movable between a first position and a second position, and
a frame part designed to be fastened to the mating door piece and connected to the safety switching controller via multi-channel redundant signal lines, the frame part comprising a recess formed in said frame part and in which the bolt engages in the second position, a locking element movable between a third position and a fourth position and designed to latch the bolt in the second position for locking the guard door in the closed position, an actuator for moving the locking element from the third to the fourth position, said locking element latching said bolt when in the third position, a first position sensor designed to detect when said bolt is in at least one of the first and second positions and to transmit via said multi-channel redundant signal lines a first sensor signal in dependence thereon to indicate when the guard door is in the closed position and said bolt is in said at least one of the first and second positions, and a door release unit integral to the frame part and configured to transmit via said multi-channel redundant signal lines a door release request signal in addition to the system enable signal, said door release request signal signaling to the safety switching controller a request to provide a drive signal that operates the actuator to move the locking element from the third position to the fourth position.

11. The safety switch of claim 10, wherein the first position sensor is designed to detect the second position of the bolt.

12. The safety switch of claim 10, wherein the bolt comprises a first transponder, and wherein the first position sensor is arranged in the region of the recess in order to read the first transponder only when the bolt is in the second position.

13. The safety switch of claim 12, further comprising a second transponder, wherein the door release unit comprises a release request sensor configured to detect the second transponder, and wherein the door release unit generates the door release request signal in response to the detection of a valid second transponder.

14. The safety switch of claim 13, wherein the second transponder comprises unique identification data and the door release unit generates the door release request signal in accordance with the detection of said unique identification data.

15. The safety switch of claim 13, further comprising a memory unit for temporarily storing the unique identification data upon a first detection of said unique identification data from the second transponder, with said safety switch generating the system enable signal only after a second detection of the unique identification data from the second transponder.

* * * * *